United States Patent
Park (10) Patent No.: US 8,901,871 B2
(45) Date of Patent: Dec. 2, 2014

(54) ROBUST CONTROLLER FOR ELECTRO-MECHANICAL ACTUATORS EMPLOYING SLIDING AND SECOND CONTROL MODES

(71) Applicant: Woodward HRT, Inc., Santa Clarita, CA (US)

(72) Inventor: Austin Dukhyun Park, Burbank, CA (US)

(73) Assignee: Woodward HRT, Inc., Santa Clarita, CA (US)

( * ) Notice: Subject to any disclaimer, the term of this patent is extended or adjusted under 35 U.S.C. 154(b) by 180 days.

(21) Appl. No.: 13/661,728

(22) Filed: Oct. 26, 2012

(65) Prior Publication Data

US 2014/0117918 A1    May 1, 2014

(51) Int. Cl.
G05B 5/01    (2006.01)

(52) U.S. Cl.
USPC ........................... 318/611; 318/560; 318/610

(58) Field of Classification Search
USPC ............... 318/611, 560, 610, 600, 569, 567; 701/71, 70; 369/44.32
See application file for complete search history.

(56) References Cited

U.S. PATENT DOCUMENTS

| | | | |
|---|---|---|---|
| 5,924,281 A | 7/1999 | Yasui et al. | |
| 5,937,638 A | 8/1999 | Akazaki et al. | |
| 6,079,205 A | 6/2000 | Yasui et al. | |
| 6,684,147 B2 | 1/2004 | Park et al. | |
| 6,760,657 B2 | 7/2004 | Katoh | |
| 7,783,580 B2 | 8/2010 | Huang et al. | |
| 2006/0072391 A1 | 4/2006 | Zhou | |
| 2012/0136462 A1* | 5/2012 | Shimizu | 700/31 |

OTHER PUBLICATIONS

"Sliding Mode Control," Published by extraincome108 at http://www.scribd.com/doc/223757820/16-Sliding-Mode-Control, 9 pages.
Ming, Qian, "Chapter 5 Sliding Mode Control," http://scholar.lib.vt.edu/theses/available/etd-5440202339731121/unrestricted/CHAP4_DOC.pdf, Apr. 18, 1997, 10 pages.
Kachroo, P. et al., "Chattering reduction and error convergence in the sliding-mode control of a class of nonlinear systems," (1996) Faculty Publications (ECE), Paper 35, University of Nevada, Las Vegas, IEEE Transactions on Automatic Control, vol. 41, No. 7, Jul. 1996, 7 pages.
Slotine, Jean-Jacques, E., et al., "Chapter 7 Sliding Control," Applied Nonlinear Control—Slotine, 1991 Prentice Hall Inc., http://www.scribd.com/doc/148574329/1991-Applied-Nonlinear-Control-Slotine, pp. 276-285.

(Continued)

Primary Examiner — Karen Masih
(74) Attorney, Agent, or Firm — BainwoodHuang (57) ABSTRACT

An improved technique for controlling an electro-mechanical actuator combines a sliding mode of control with a second mode of control. An error signal is generated based on the difference between an input position signal and a feedback position signal. When the error signal is above a predetermined threshold, the actuator is controlled in the sliding control mode. When the error signal is below the predetermined threshold, the actuator is controlled in the second control mode. The combination of the sliding control mode with the second control mode yields a robust controller that can tolerate large parameter variations and uncertainties without sacrificing precise steady state tracking.

20 Claims, 7 Drawing Sheets

(56) References Cited

OTHER PUBLICATIONS

Benamor, A., et al., "Sliding Mode Control, with Integrator, for a Class of MIMO Nonlinear Systems," Scientific Research, Engineering, 2011, 3, 435-444, http://www.scirp.org/journal/eng/, published online May 2011, 10 pages.

Alipour, H., et al., "A PID Sliding Mode Control for Ropeless Elevator Maglev Guiding System," Scientific Research, Energy and Power Engineering, 2012, 4, 158-164, http://www.scirp.org/journal/eng/, published online May 2012, 7 pages.

Kuo, T., et al., "Adaptive PID with Sliding Mode Control for the Rotary Inverted Pendulum System," IEEE/ASME International Conference on Advanced Intelligence Mechatronics, Suntec Convention and Exhibition Center, Singapore, Jul. 14-17, 2009, 6 pages.

Kuo, T., et al., "Adaptive Sliding Mode Control with PID Tuning for Uncertain Systems," Engineering Letters, 16:3, EL__16__3__06, 5 pages.

Rhif, A., "A High Order Sliding Mode Control with PID Sliding Surface: Simulation on a Torpedo," International Journal of Information Technology, Control and Automation (IJITCA), vol. 2, No. 1, Jan. 2012, 13 pages.

Kuo, T., "Robust PID Control with Sliding Mode and Adaptive Rules for Uncertain Systems," Presentation for Department of Electrical Engineering, Ching-Yun University, 19 pages.

Rhif, A., "Stabilizing Sliding Mode Control Design and Application for a DC Motor: Speed Control," International Journal of Information Technology, Control and Automation (IJITCA), vol. 2, No. 1, Jan. 2012, 10 pages.

\* cited by examiner

ROBUST CONTROLLER FOR ELECTRO-MECHANICAL ACTUATORS EMPLOYING SLIDING AND SECOND CONTROL MODES

BACKGROUND

Electro-mechanical actuators are used on airborne vehicles and guided projectiles to establish and maintain the positions of position-controlled elements (PCEs), such as fins, flaps and other flight control surfaces. Mechanical power is generated by a motor within an electro-mechanical actuator and coupled to a PCE via a mechanical drive linkage. Control of an actuator is typically managed by a control circuit, or "controller," which is responsible for accurately positioning the PCE in response to a positioning command. The positioning command may be generated by a navigation system, for example, which is responsible for moving the airborne vehicle or projectile along a desired flight path. In some examples, the positioning command is expressed as an angle, which corresponds to a desired angular position of the PCE.

In a typical arrangement, the controller for an electro-mechanical actuator receives a position command signal as well as a position feedback signal indicating the actual position of the PCE. The position feedback signal may be provided from a Hall-effect sensor within the motor of the electro-mechanical actuator. The controller processes the position command signal and the feedback signal to generate a control signal, which drives the actuator's motor. The controller can thus control the electro-mechanical actuator to establish and maintain the actual position of the PCE at the desired position prescribed by the position command signal.

One general class of controller for electro-mechanical actuators is the proportional-integral-derivative, or "PID," controller. The PID controller allows a designer to specify parameters of separate proportional, integral, and derivative blocks. Designers can place poles and zeroes in the controller's transfer function to compensate for dynamics of the motor and the electro-mechanical actuator, for establishing stability and desired response characteristics. The use of PID controllers in connection with motors is discussed, for example, by R. Krishnan in "Electric Motor Drives Modeling, Analysis, and Control," Prentice Hall, N.J., 2001.

Other classes of controllers for electro-mechanical actuators include optimal and adaptive control schemes. Optimal controllers show an advantage over PID controllers where the design goal is to provide an optimized control effort within an assumed range of parameter variations. Adaptive controllers, such as gain-scheduled controllers, can vary their parameters to adapt to changes in their operating environments.

SUMMARY

The control of electro-mechanical actuators in airborne applications presents particular challenges. For example, the environmental temperature in which the actuators operate typically varies over a wide range, causing temperature-dependent changes in load characteristics. In addition, manufacturing tolerances of motor parameters and transmission efficiency vary widely, such that motor characteristics can be considerably different from one unit to the next. Also, where electro-mechanical actuators are powered from batteries, battery voltages can be uncertain with large manufacturing tolerances and battery voltages may change substantially with temperature. Further, flight duty cycle, i.e., the torque required to move a position control element, typically changes substantially and non-linearly as airspeed changes. These factors present difficult challenges in controlling electro-mechanical actuators for airborne applications.

Unfortunately, PID controllers, optimal controllers, and adaptive controllers tend to be ill-suited for operation involving such variable and non-linear characteristics. Although PID controllers can typically be tuned to perform well under one set of conditions, they tend to be less well-suited when conditions change. Similarly, optimal controllers are typically tuned for a narrow band of parameter variations, but their performance typically degrades rapidly outside that band. Performance of optimal controllers also degrades in the face of high frequency perturbed dynamics. Adaptive controllers can usually be stabilized over a wide range of operating parameters; however, such stability is typically achieved by substantially increasing the order of such controllers, which results in complex designs with very high latency.

We have recognized that another type of controller is well suited in certain respects for the challenges at hand. This type of controller, known as a sliding mode controller, can be designed to behave consistently in the face of large parameter variations and non-linearities. Sliding mode controllers operate by generating a time-varying sliding function, $s(t)$, where $s(t)=0$ defines an invariant sliding surface in a phase plane. The sliding function is calculated as a weighted sum of a difference signal and its derivative(s), where the difference signal is the difference between a desired value of the output of interest and a feedback value. Operation of feedback tends to drive the output state trajectory to the sliding surface. Once the sliding surface is reached, feedback further tends to drive the output of interest to the desired value by driving the output state trajectory along the sliding surface in the phase plane with first-order settling characteristics. The overall system being controlled may have a high order, but the sliding function is constrained such that it behaves as a first order system, greatly simplifying control. The theoretical basis for sliding mode control is explained, for example, in Applied Nonlinear Control, by Slotine and Li (Slotine, J. J. E., and W. Li, Applied Nonlinear Control, Prentice-Hall (1991)).

Although sliding mode control confers distinct advantages in variable and uncertain environments, it tends to suffer from a significant drawback—sliding mode control tends to cause chattering in the vicinity of the sliding surface, resulting in high frequency and high speed instability. Chattering results from switching between opposing control magnitudes at the sliding surface. Although sliding mode control can account for the presence of modeling imprecision and of parameter uncertainties, the problem of chattering makes sliding controllers a less-than-ideal solution for controlling actuators in airborne applications.

In contrast with these prior approaches, an improved technique for controlling an electro-mechanical actuator combines a sliding mode of control with a second mode of control that is not susceptible to chattering. An error signal is generated based on the difference between an input position signal and a feedback position signal. When the error signal is above a predetermined threshold, the actuator is controlled in the sliding control mode. When the error signal is below the predetermined threshold, the actuator is controlled in the second control mode. Sliding mode control brings the actuator close to an invariant sliding surface, even in the face of wide variations and uncertainties in system parameters, while the second-control mode takes over as the invariant sliding surface is approached, to promote precise tracking without chattering.

With the improved technique, chattering may still arise during sliding mode control, but sliding mode control is generally applied only when the output trajectory of the electro-mechanical actuator in the phase plane is far from the sliding surface, e.g., when the position of the electro-mechanical actuator is changing, such as when new inputs are received and when responding to perturbations. Chattering typically does not arise once a steady-state value is approached, as control in the vicinity of steady state is maintained by the second control mode.

According to one variant, the effects of chattering are further reduced by establishing a boundary layer around the sliding surface and providing continuous gain across the boundary layer, thereby eliminating the discontinuity in gain across the sliding surface that would otherwise be present. Chattering can thus be substantially reduced or eliminated in most if not all cases.

In an example, the second control mode is PID control; however, this is not required. Alternatively, the second control mode may be realized with Kalman control, H2 control, or H-infinity control, and so forth, for example.

Certain embodiments are directed to a method of controlling an electro-mechanical actuator. The method includes receiving a first signal indicating a desired position of the electro-mechanical actuator and receiving a second signal indicating an actual position of the electro-mechanical actuator. An error signal is calculated based on the first signal and the second signal. The method further includes controlling the position of the electro-mechanical actuator in a sliding control mode when the error signal is above a predetermined threshold and controlling the position of the electro-mechanical actuator in a second control mode when the error signal is below the predetermined threshold.

Other embodiments are directed to a control circuit for controlling an electro-mechanical actuator. The control circuit includes a sliding mode controller configured to generate a sliding mode control signal and a second controller configured to generate a second mode control signal. The control circuit further includes an error circuit configured to generate an error signal based on a difference between an input signal indicative of a desired position of the electro-mechanical actuator and a feedback signal indicative of an actual position of the electro-mechanical actuator. The control circuit still further includes a selector circuit coupled to the sliding mode controller, the second controller, and the error circuit. The selector circuit is configured (i) to select the sliding mode control signal to control the electro-mechanical actuator when the error signal is above a predetermined threshold and (ii) to select the second mode control signal to control the electro-mechanical actuator when the error signal is below the predetermined threshold.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for controlling an electro-mechanical actuator combines a sliding mode of control with a second mode of control. An error signal is generated based on the difference between an input position signal and a feedback position signal. When the error signal is above a predetermined threshold, the actuator is controlled in the sliding control mode. When the error signal is below the predetermined threshold, the actuator is controlled in the second control mode. The combination of the sliding control mode with the second control mode yields a robust controller that can tolerate large parameter variations and uncertainties without sacrificing precise steady state tracking.

Figure 1:
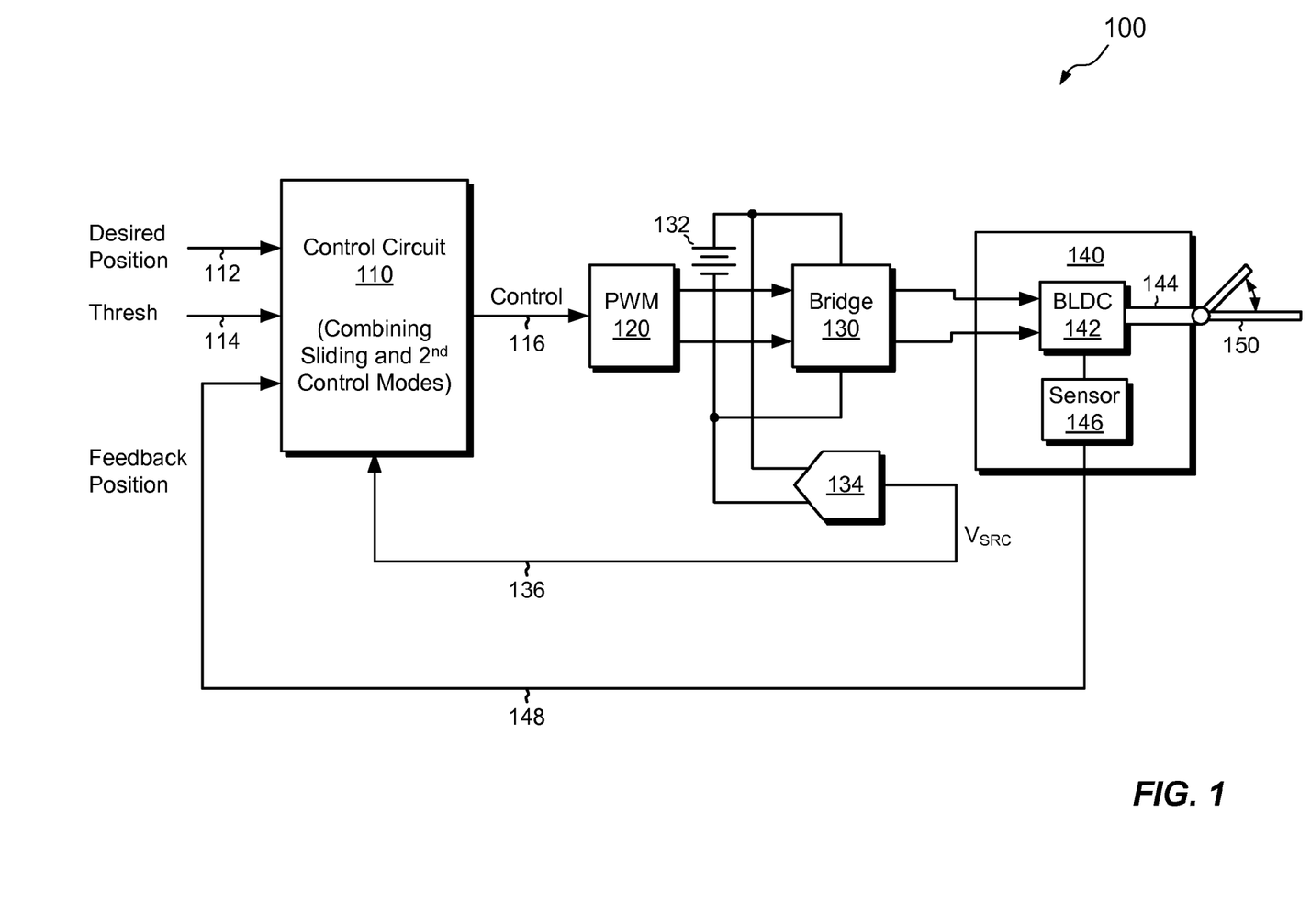
FIG. 1 is a block diagram of an example apparatus in which the position of an electro-mechanical actuator is controlled according to the improvements hereof.

FIG. 1 shows an example apparatus 100 in which the position of an electro-mechanical actuator 140 is controlled using the improved technique hereof. The apparatus 100 is seen to include a control circuit 110, which combines a sliding control mode and a second control mode which are selected based on a predetermined threshold 114. An input signal 112 received, for example, from a guidance system, indicates a desired position of the electro-mechanical actuator 140. The control circuit 110 produces an output in the form of a control signal 116. The control signal 116 drives a pulsewidth modulator 120, which is coupled to a bridge 130. A power source, such as a battery 132, provides power to the bridge 130. A measuring circuit, such as an analog-to-digital converter 134, is coupled to the battery 132, to measure the voltage across the battery 132 and to produce a battery voltage signal 136. The bridge 130 is coupled to a brushless DC motor 142 of the electro-mechanical actuator 140. The brushless DC motor 142 has a shaft 144, which is coupled to a position control element, such as a flap 150. Other mechanical linkages, such as gears and other couplings, may be provided. In the example shown, the angle of the flap 150 is varied by varying the angle of the shaft 144. It is understood that other types of position control elements can be provided that can be moved in rotation, translation, or in any other manner, as appropriate for their purposes, and that such position control elements may be controlled in a similar manner to that shown. A sensor 146 is provided, e.g., within the electro-mechanical actuator 140, to measure the rotational position of the shaft 144. In an example, the sensor 146 is a Hall-effect sensor. The sensor 146 generates a feedback signal 148, which is provided to the control circuit 110. Other types of sensors may be used, such as optical encoders, magnetic encoders, potentiometers, and resolvers, for measuring the angular position of the shaft 144 of the brushless DC motor 142 or position of the flap 150.

In operation, the control circuit 110 generates the control signal 116 based on a difference between the desired position 112 and the actual position as indicated by the feedback signal 148. The pulsewidth modulator 120 receives the control signal 116 and generates output signals for driving the bridge 130. In an example, the output signals of the pulsewidth modulator 120 are provided in the form of rectangular waveforms having constant frequency but variable pulsewidth. As the control signal 116 increases, the pulsewidth modulator 120 produces longer pulsewidths. As the control signal 116 decreases, the pulsewidth modulator 120 produces shorter pulsewidths. In an example, the bridge 130 is an H-bridge that includes four switching elements (e.g., transistors) arranged in an "H" configuration. The bridge 130 has two outputs, which are coupled to a set of windings of the brushless DC motor 142. Depending on the signals from the pulsewidth modulator 120, the voltage applied to the windings of the brushless DC motor 142 is equal to either zero volts, the voltage of the battery 132, or the negative of the voltage of the battery 132. The brushless DC motor 142 responds to pulsed voltage applied to its windings by rotating the shaft 144 in a controlled manner, either clockwise or counterclockwise. As the shaft 144 rotates, the flap 150 rises or lowers. The sensor 146 measures the rotational position of the shaft 144 and reports the position to the control circuit 110 via the feedback signal 148. As the rotation of the shaft 144 corresponds directly to the position of the flap 150, the feedback signal 148 provides an accurate measure of the actual rotational position of the flap 150.

The control circuit 110 controls the position of the flap 150 using feedback. For example, the control circuit 110 receives the feedback signal 148, compares it with the input signal 112, and varies the level of the control signal 116 to drive the feedback signal 148 to the value that corresponds to the desired position 112. In controlling the position of the flap 150, the control circuit 110 alternately applies a sliding control mode and a second control mode. The control circuit 110 applies the sliding control mode when an error signal based on the desired position 112 and the feedback position 148 exceeds the predetermined threshold 114 and applies the second control mode when the error signal is less than the predetermined threshold 114. The control circuit 110 thus benefits from the ability of the sliding control mode to bring the position of the flap 150 close to the invariant sliding surface (i.e., close to steady state), even when faced with wide variations and uncertainties in operating parameters, as it also benefits from the ability of the second control mode to provide accurate steady-state tracking without chattering.

Figure 2:
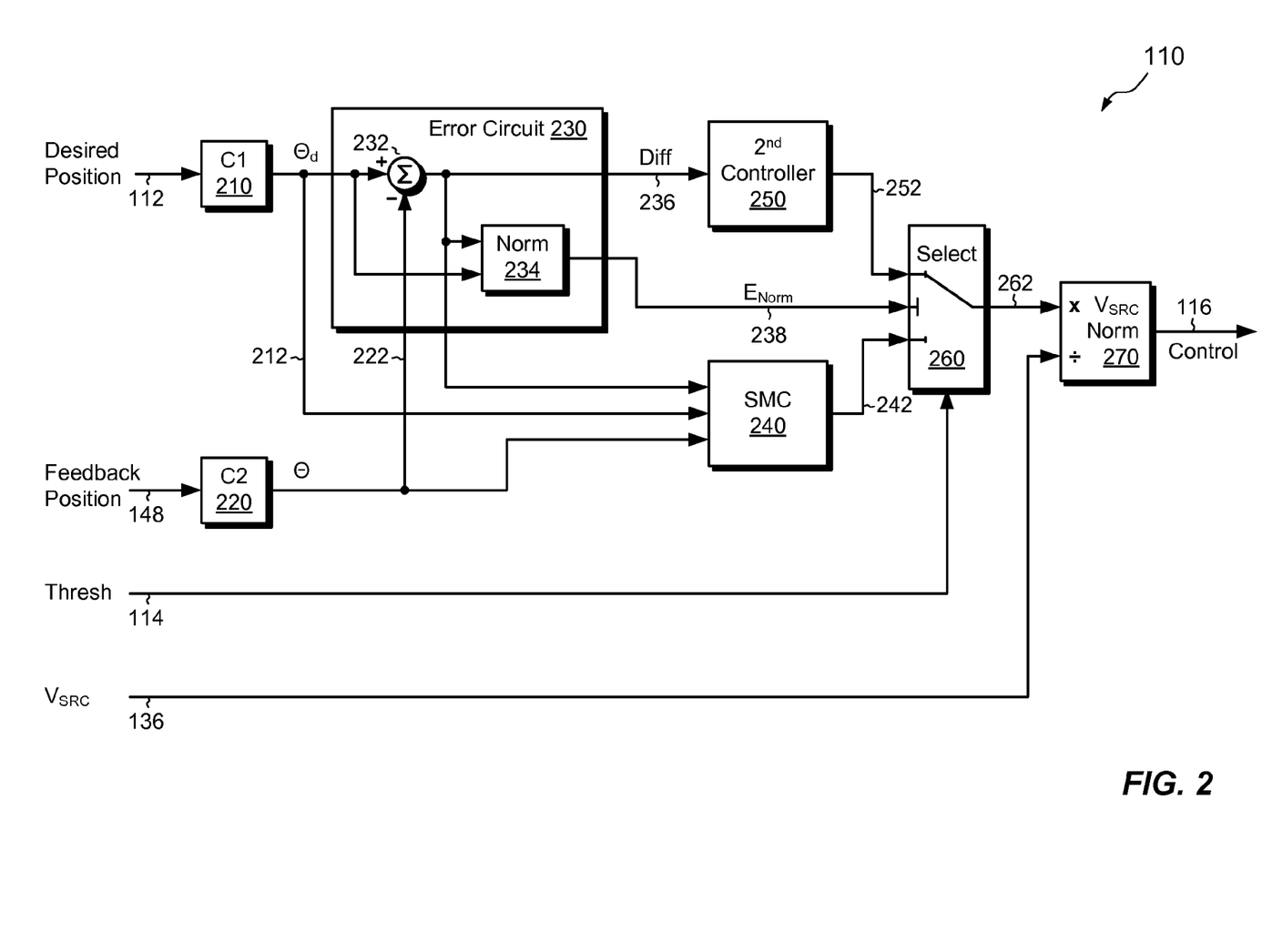
FIG. 2 is a block diagram of the control circuit of FIG. 1, including a sliding mode controller and a second controller.

The value of the predetermined threshold 114 can be established as appropriate for the particular target application by trial and error. In an example, the threshold 114 is set at 1% of the full-scale range of the control signals 242 and 252.

FIG. 2 shows the control circuit 110 in additional detail. As shown, the control circuit 110 includes a first converter 210, a second converter 220, an error circuit 230, a sliding mode controller 240, a second controller 250, a selector 260, and a source voltage normalization circuit 270. The first converter 210 converts the desired position signal 112 into units of radians (or some other suitable units). In an example, where the desired position signal 112 is received in units of degrees, the first converter 210 converts the desired position signal 112 into a first converted signal 212 ($\Theta_d$), expressed in units of radians, by multiplying by $\pi/180$. The second converter 220 converts the feedback signal 148 into a second converted signal 222 ($\Theta$), which is expressed in the same units as the first converted signal 212 (e.g., radians). In addition to performing unit conversion, the first and second converters 210 and 220 may perform other corrections, as needed, such as to correct for variable gear ratios or other known characteristics the motor 142, sensor 146, flap 150, and any linkages between the motor 142 and the flap 150.

The error circuit 230 includes a difference circuit 232 and a normalizing circuit 234. The difference circuit 232 receives the first and second converted signals 212 and 222 and generates a difference signal 236 (Diff) equal to the difference between these signals. The difference signal 236 thus corresponds to the difference between the desired position signal 112 and the feedback position signal 148. The normalizing circuit 234 receives the difference signal 236 as well as the first converted signal 212 and generates an error signal 238 (e.g., a normalized error signal, $E_{Norm}$). In an example, the error signal 238 is computed as the absolute value of the quotient of the difference signal 236 divided by the first converted signal 212. The error signal 238 is thus expressed as a number greater than or equal to zero, whose value scales relative to the magnitude of the first converted signal 212, i.e., in relation to the magnitude of the desired position signal 112.

The sliding mode controller 240 receives the first and second converted signals 212 and 222 as input, as well as the difference signal 236. The sliding mode controller 240 operates in response to its inputs to generate a sliding mode control signal 242. The second controller 250 also receives the difference signal 236 and operates in response to the difference signal 236 to generate a second control signal 252. Depending on the particular design of the second controller 250, the second controller 250 may receive additional input signals.

The selector 260 receives the sliding mode control signal 242 and the second control signal 252 and selects between them to produce an output signal 262. The operation of the selector 260 is based on a comparison of the error signal 238 with the predetermined threshold 114. If the error signal 238 is greater than or equal to the threshold 114, the selector 260 selects the sliding mode control signal 242, i.e., the selector 260 provides the sliding mode control signal 242 as the output 262. If the error signal 238 is less than the threshold 114, the selector 260 selects the second control signal 252 as the output signal 262.

The source voltage normalization circuit 270 adjusts the output signal 262 of the selector 260 to adjust for variations in voltage from the battery 132. For example, the source voltage normalization circuit 270 divides the output signal 262 by the battery voltage signal 136, to produce the control signal 116, i.e., the output of the control circuit 110.

Compensation for battery voltage is based on the observation that the open-loop gain of the apparatus 100 varies in proportion to the voltage of the battery 132. Battery voltage can vary substantially with manufacturing tolerances, changes in temperature, and with use. The greater the voltage on the battery 132, the greater the voltage applied to the motor 142 and the greater the motor's slew rate response. Normalizing the output signal 262, i.e., by dividing the output signal 262 by the voltage of the battery 132, thus has the effect of compensating for changes in open-loop gain that occur as a result of battery voltage changes. In some examples, the measurement circuit 134 measures the voltage of the battery 132 at a high rate, such that the battery voltage signal 136 tracks changes in the voltage of the battery 132 as they occur and the source voltage normalization circuit 270 corrects for changes in battery voltage in real time.

Preferably, the control circuit 110 is implemented in digital form, where the components of the control circuit 110 operate synchronously in accordance with a clock. The desired position signal 112 and the predetermined threshold 114 are digital values, and the feedback position signal 148 and the battery voltage signal 136 are discrete-time sampled digital signals.

The control circuit 110 can be constructed in any suitable way. For example, the control circuit 110 can be implemented as an Application-Specific Integrated Circuit (ASIC), a Field-Programmable Gate Array (FPGA), with one or more DSP (Digital Signal Processing) units, microprocessors, computers, and/or any combination of the above, for example. It is understood that the identified components of the control circuit 110 need not be physically distinct structures. For example, any of the structures shown in FIG. 2 can be implemented in code residing in memory of a computing device and run by one or more processors. Indeed, some of the structures shown (e.g., the converters 210 and 220, the selector 260, and the source voltage normalization circuit 270 can be implemented in as little as a few lines of code). The code can be stored in ROM or in RAM, in the form of software, firmware, or custom hardware. Such code executed by one or more processors or custom hardware forms the specialized circuit components shown in FIG. 2.

Figure 3:
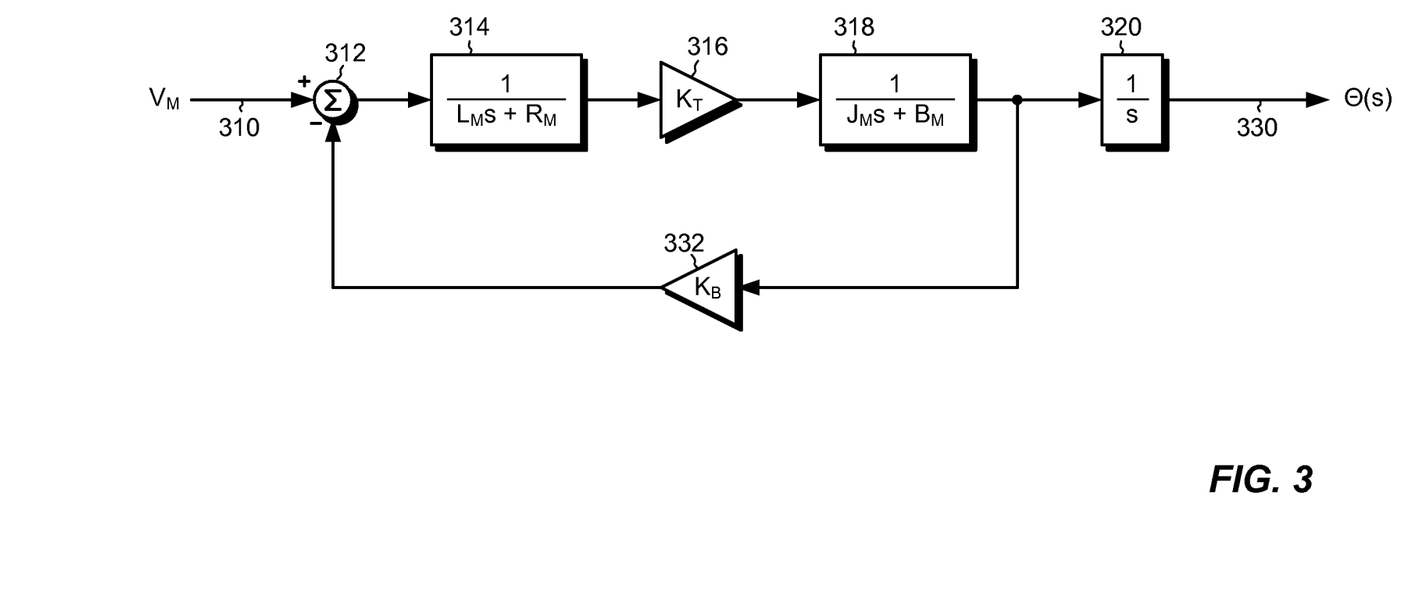
FIG. 3 is a block diagram of an example model of the brushless DC motor shown in FIG. 1.

FIG. 3 shows a model 300 that represents the behavior of the brushless DC motor 142. As the brushless DC motor 142 is typically the most variable and unpredictable element in the apparatus 100, the model 300 provides a basis for selecting design parameters of the sliding controller 240.

Here, the model 300 is seen to receive an input signal 310 ($V_M$) of the brushless DC motor 142, which corresponds to the pulsed voltage applied to the brushless DC motor 142 from the bridge 130, and to generate an output signal 330 ($\Theta(s)$), which corresponds to the angle of the motor shaft 144. The model 300 is seen to include a summer 312, a first block 314, a first gain element 316, a second gain block 318, an integrator 320, and a second gain element 332, connected as shown.

In the model 300, $L_M$ represents the motor inductance (Henrys), $R_M$ represents the motor resistance (Ohms), $K_T$ represents the motor torque constant (in-lbf/Amp), $J_M$ represents the motor rotor inertia (in-lbf-sec$^2$), and $B_M$ represents the motor viscous damping coefficient (in-lbf-sec/radian). In this example, the motor current limit logic, cogging torque, commutation loss, torque ripple effect, and load side structural dynamics are ignored for simplicity.

In computing an overall transfer function of the form $\Theta(s)/V_M$, it is noted that the third order term of the denominator can be neglected without loss of model accuracy, as the electric time constant ($L_M/R_M$) is very small. Thus, the following transfer function for the brushless DC motor 142 is obtained:

$$\frac{\theta(s)}{V_m(s)} = \frac{K_T/(R_m B_m + K_T K_b)}{\tau \cdot s^2 + s} \tag{1}$$

where $\tau$ is the mechanical time constant expressed as:

$$\tau = \frac{R_m J_m}{R_m B_m + K_T K_b} \tag{2}$$

Thus, a differential equation of the brushless DC motor 142 is determined as $$\tau \cdot \ddot{\theta} + \dot{\theta} = \frac{K_T}{R_m B_m + K_T K_b} \cdot V_m \tag{3}$$

Figure 4:
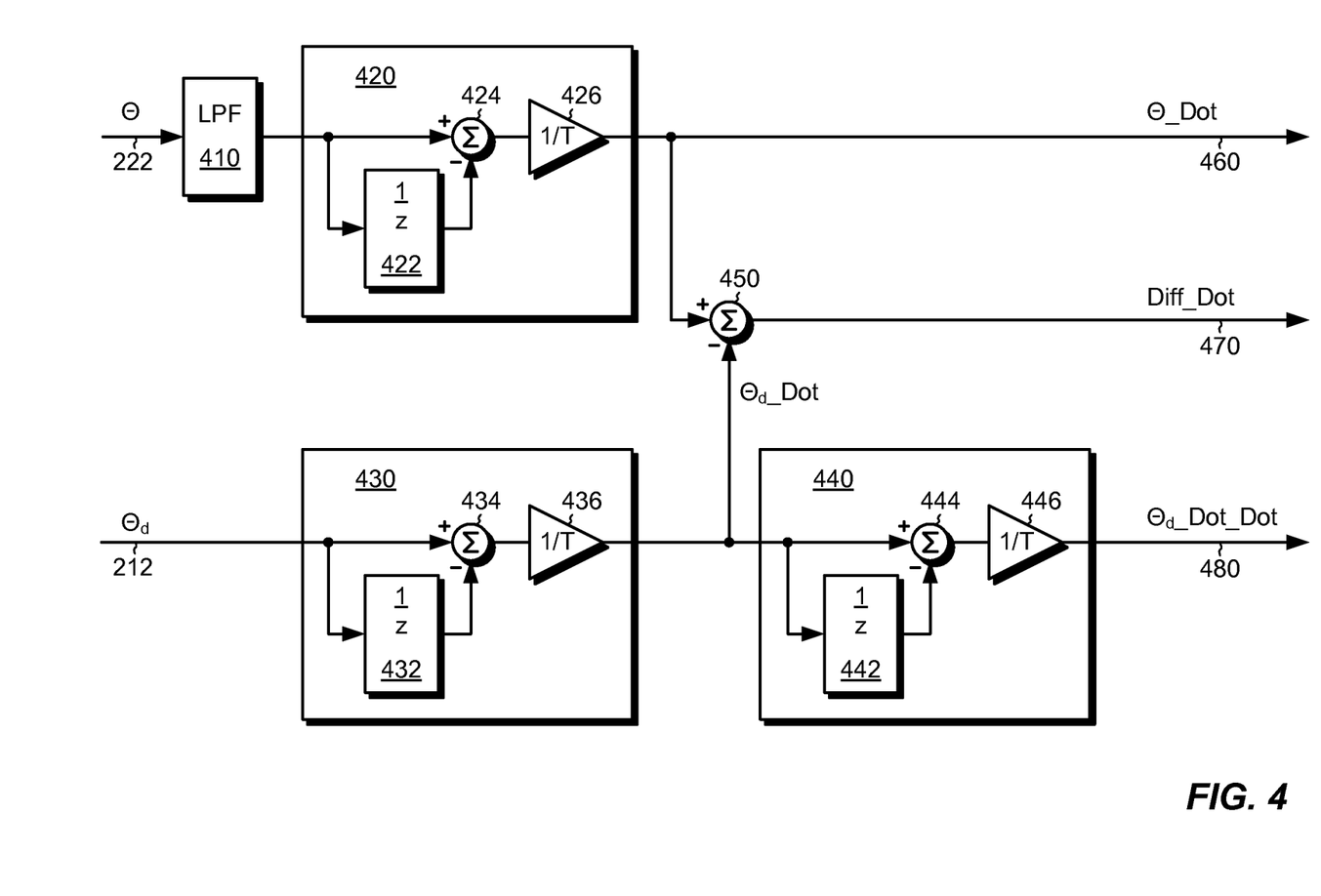
FIG. 4 is a block diagram showing portions of the example sliding mode controller of FIG. 2.
Figure 5:
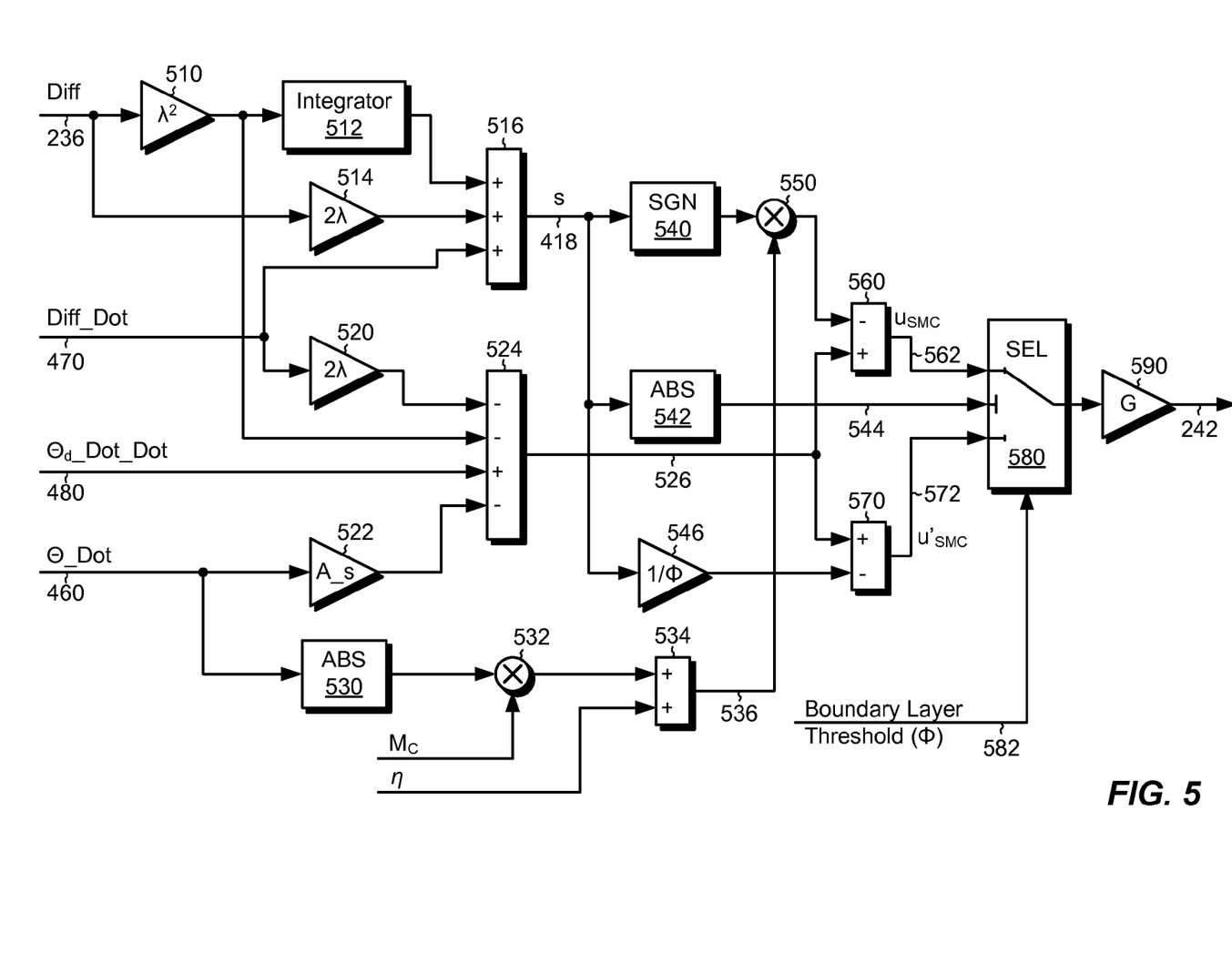
FIG. 5 is a block diagram showing additional portions of the example sliding mode controller of FIG. 2.

FIGS. 4 and 5 show an example detailed implementation of the sliding mode controller 240. The design parameters for the sliding mode controller 240 are based in part on the model 300 of the brushless DC motor 142. A mathematical development of the design parameters of the sliding mode controller 240 will now be described.

For realizing the sliding mode controller 240, it is noted that Equation (3) can be rearranged as follows:

$$\ddot{\theta} = f + u_{SMC}, \tag{4}$$

where $$f = -\frac{1}{\tau}\dot{\theta} \tag{5a}$$

and $$u_{SMC} = \frac{K_T}{R_m J_m} \cdot V_m. \tag{5b}$$

An estimated model of nominal state maybe defined as:

$$\tilde{f} = A \cdot \dot{\theta}. \tag{6}$$

Also, the following inequality is established from the Equations (5a) and (6):

$$|\tilde{f} - f| = \left|\left(A + \frac{1}{\tau}\right) \cdot \dot{\theta}\right| \le M(t), \tag{7}$$

where $$M(t) = M_c \cdot |\dot{\theta}| \tag{8a}$$

and $$M_c = \left|A + \frac{1}{\tau}\right|. \tag{8b}$$

To track the first converted signal 212, i.e., $\theta(t) = \theta_d(t)$, the sliding function is defined, as follows:

$$s = \left(\frac{d}{dt} + \lambda\right)^2 \cdot \int_0^t e \, dt = \dot{e} + 2 \cdot \lambda \cdot e + \lambda^2 \cdot \int_0^t e \, dt, \tag{9}$$

with $$e(t) = \theta(t) - \theta_d(t). \tag{10}$$

Here the $\theta_d(t)$ denotes the first converted signal 212, which corresponds to the desired position 112. The sliding function is defined above to include an integral term to drive to zero steady-state errors caused by torque disturbances from coupled load-side structures. The unique solution on $s(t)=0$ (the sliding surface) is: $e(t)=0$, for all $t>0$, where $e(t)$ corresponds to the difference signal 236. The problem of tracking is to ensure that $\Theta(t)=\Theta_d(t)$ (the first converted signal 212) remains on the sliding surface $s(t)=0$ of the phase plane.

The best estimate of equivalent control is obtained by $\dot{s}=0$. From the Equations (4) and (9), $$\dot{s} = \tilde{f} + u_{SMC} - \ddot{\theta}_d + 2 \cdot \lambda \cdot \dot{e} + \lambda^2 \cdot e = 0 \quad (11)$$

Thus, the control estimate is derived as:

$$\tilde{u}_{SMC} = -\tilde{f} + \ddot{\theta}_d - 2 \cdot \lambda \cdot \dot{e} - \lambda^2 \cdot e \quad (12)$$

The sliding mode control law is then determined as:

$$u_{SMC} = \tilde{u}_{SMC} - k \cdot \text{sgn}(s), \text{ where } k = M(t) + \eta. \quad (13)$$

By substitution of Equations (6), (8), and (12) into the Equation (13), the control law takes the following form.

$$u_{SMC} = -A\dot{\theta} + \ddot{\theta}_d - 2 \cdot \lambda \cdot \dot{e} - \lambda^2 \cdot e - (M_c \cdot |\dot{\theta}(t)| + \eta) \cdot \text{sgn}(s). \quad (14)$$

The simplified, first-order problem of keeping the scalar "s" at zero (i.e., on the sliding surface) can thus be achieved by choosing the control law $u_{SMC}$ of Equation (13) such that $$\frac{1}{2}\frac{d}{dt}s^2 \leq -\eta \cdot |s|, \quad (15)$$

where $\eta$ is a strictly positive constant.

By substitution of Equations (4), (9), (10), (12), and (13) into Equation (15), the condition is checked as follows.

$$\frac{1}{2}\frac{d}{dt}s^2 = (f - \tilde{f}) \cdot s - k \cdot |s| \leq (|f - \tilde{f}| - k) \cdot |s| \quad (16a)$$

and $$(|f - \tilde{f}| - k) \cdot |s| \leq (M(t) - k) \cdot |s| = -\eta \cdot |s|. \quad (16b)$$

Therefore, it is observed that the sliding condition is satisfied.

Although the control law of Equation (14) guarantees convergence in finite time, some undesirable chattering at the sliding surface often occurs due to the discontinuous nature of the SGN function. The inherent nature of chattering might be further exacerbated by the ignored components, such as torque ripple, load side structural dynamics, and so forth. The problem of chattering can be reduced or eliminated altogether by establishing a boundary layer of thickness $\Phi$ and approximately linearizing the control effort when $|s|$ falls inside of the boundary layer. Thus, $$\text{if } |s| < \Phi \quad (17)$$

$$u'_{SMC} = \tilde{u} - \frac{s}{\Phi} =$$

$$-A\dot{\theta} + \ddot{\theta}_d - 2 \cdot \lambda \cdot \dot{e} - \lambda^2 \cdot e - \frac{\dot{e} + 2 \cdot \lambda \cdot e + \lambda^2 \cdot \int_0^t e\, dt}{\Phi}$$

$$\text{elseif } |s| \geq \Phi, \quad (14)$$

$$u_{SMC} = -A\dot{\theta} + \ddot{\theta}_d - 2 \cdot \lambda \cdot \dot{e} - \lambda^2 \cdot e - (M_c \cdot |\dot{\theta}(t)| + \eta) \cdot \text{sgn}(s)$$

It is noted that the velocity and acceleration terms within the equations above are required to be known precisely. This does not mean that number of sensors have to be increased, however. The required velocities and accelerations can be generated from position signals if processing speed is sufficiently high.

FIG. 4 shows the development of the required velocity and acceleration terms. Here, it is seen that the second converted signal 222 ($\Theta$) is subjected to a digital low-pass filter 410 and then to a differentiation stage 420, to produce a discrete-time sampled velocity signal 460 ($\Theta\_\text{Dot}$). The differentiation stage 420 includes a unit delay 422, a summer 424, and a gain element 426. The gain element 426 has a gain of 1/T, where T is the sampling interval. In an example, the sampling interval is 1 millisecond. The low-pass filter 410 is provided to remove high-frequency content from the sampled motor shaft position. In an example, the low-pass filter 410 has a cut-off frequency of 30 Hz and has a transfer function of num(z)/(z−0.1518).

The first converted signal 212 ($\Theta_d$) is subjected to a differentiation stage 430, to produce a discrete-time sampled velocity signal ($\Theta_d\_\text{Dot}$). The differentiation stage 430 includes a unit delay 432, a summer 434, and a gain element 436. A summer 450 subtracts $\Theta_d\_\text{Dot}$ from $\Theta\_\text{Dot}$ to produce a discrete-time sampled velocity difference signal 470 (Diff\_Dot). Also, $\Theta_d\_\text{Dot}$ is subjected to another differentiation stage 440, including elements 442, 444, and 446, to produce a discrete-time sampled acceleration signal 480 ($\Theta_d\_\text{Dot}\_\text{Dot}$).

FIG. 5 shows an example realization of the sliding mode controller 240. Here, the sliding mode controller 240 is seen to receive the velocity and acceleration terms, whose generation is shown in FIG. 4, as well as the difference signal 236 (FIG. 2). The sliding mode controller also receives as input the four control gains ($M_c$, $\eta$, $\lambda$ and $\Phi$) specified by the equations above. These control gains can be tuned as appropriate to the implementation. $M_c$ can be pre-determined explicitly, whereas $\eta$, $\lambda$, and $\Phi$ can be adjusted by intentionally trading off robustness, bandwidth, and transient stability. In one example, these four values can be provided as constants. In other examples, the values of some or all of them can be varied to adapt the sliding mode controller 240 to different circumstances. In the example shown, only a single output is provided, i.e., the sliding mode control signal 242.

The illustrated components of FIG. 5 provide a circuit realization of Equations (9), (14) and (17). The sliding function "s" from Equation (9) is realized as the signal 418. The control law $u_{SMC}$ from Equation (14) is realized as the signal 562. Also, the modified control law $u'_{SMC}$ from Equation (17), which is selected for operation within the boundary layer of thickness $\Phi$, is realized as the signal 572.

The sliding function 418 ("s") is developed in accordance with Equation (9) using a gain element 510, an integrator 512, a gain element 514, and a summer 516, configured in the manner shown. A signal 526 is common to both $u_{SMC}$ and $u'_{SMC}$ and is developed in the manner shown using the a gain element 520, a gain element 522, and a summer 524. Also, a signal 536 is developed in the manner shown using an absolute value element 530, a multiplier 532, and a summer 534. In an example, the integrator 512 has a transfer function $KT(z+1)/[2(z-1)]$, where K is an adjustable constant, such as 1.0, for example. The integrator 512 is provided to drive to zero steady-state errors caused by torque disturbances from coupled load-side structures.

The control law $u_{SMC}$ (the signal 562) is then developed in the manner shown from the signal 418 ("s"), the signal 526, and the signal 536 using a sign element 540, a multiplier 550, and a summer 560. Similarly, the modified control law $u'_{SMC}$ (the signal 572) is developed in the manner shown from the signal 418 ("s") and the signal 526 using a gain element 546 and a summer 570.

A selector 580 selects between $u_{SMC}$ (562) and $u'_{SMC}$ (572) by comparing the absolute value of "s" (418), obtained via an absolute value element 542, with the a boundary layer threshold 582. In an example, the boundary layer threshold 582 is set to the boundary layer thickness, Φ. In the manner described in connection with Equation (17), the selector 580 provides $u_{SMC}$ as its output when the absolute value of "s" is greater than or equal to the boundary layer threshold 582 and provides $u'_{SMC}$ as its output when the absolute value of "s" is less than the boundary layer threshold 582. A proper value of Φ, and thus of the boundary layer threshold 582, may be established by trial and error. In an example, the value of Φ is set at between 1% and 5% the full-scale range of $u_{SMC}$. However, value of Φ is not necessarily confined to a constant but can be made an adjustable parameter to adapt to dynamic model uncertainties over time.

With sliding mode operation thus established, a gain element 590 is provided to adjust the output of the selector 580. In this example, the gain value G of the gain element 590 is set to $R_M J_M / K_T$, where $R_M$, $J_M$, and $K_T$ are modeled characteristics of the brushless DC motor 143. To explain, it is observed that the voltage $V_M$ applied to the brushless DC motor 142 is equal to the product of the voltage of the battery 132, i.e., $V_{SRC}$, times the control effort, PWM of the pulsewidth modulator 120, which is typically a fraction between 0 and 1. Stated mathematically, $$V_M = PWM \times V_{SRC}. \quad (18)$$

Substituting EQ. (5B) into EQ. (18) then provides, $$u_{SMC} = V_{SRC} \cdot PWM \cdot \frac{K_T}{R_M J_M} = V_{SRC} \cdot PWM \cdot 1/G \quad (19)$$

Thus, it is seen that $u_{SMC}$ inherently includes the factor $K_T/R_M J_M$. It is evident from continuity arguments that the same is true of $u'_{SMC}$. Setting the gain G of the gain block 590 to $R_M J_M / K_T$ thus cancels out the 1/G factor and corrects for parameters of the brushless DC motor 142. With this correction, the sliding mode control signal 242 is inherently left with a term that is significantly affected by $V_{SRC}$, the voltage of the battery 132. Referring briefly back to FIG. 2, it is seen that the source voltage normalization circuit 270 divides the sliding mode control signal 242 by $V_{SRC}$ (when the selector 260 selects the sliding mode control signal 242), thus producing the control signal 116 in a form that does not depend on $V_{SRC}$, i.e., in a form that is insensitive to changes in $V_{SRC}$.

The arrangement of FIG. 5 provides sliding mode control in accordance with design requirements while reducing or eliminating chatter at the sliding surface. As the sliding surface, by definition, is where s=0, changing the gain of the sliding mode controller 240 within the boundary layer that surrounds the sliding surface provides continuity of gain within the boundary layer, and thus avoids the discontinuity that would otherwise arise from the operation of the sign element 540.

Figure 6:
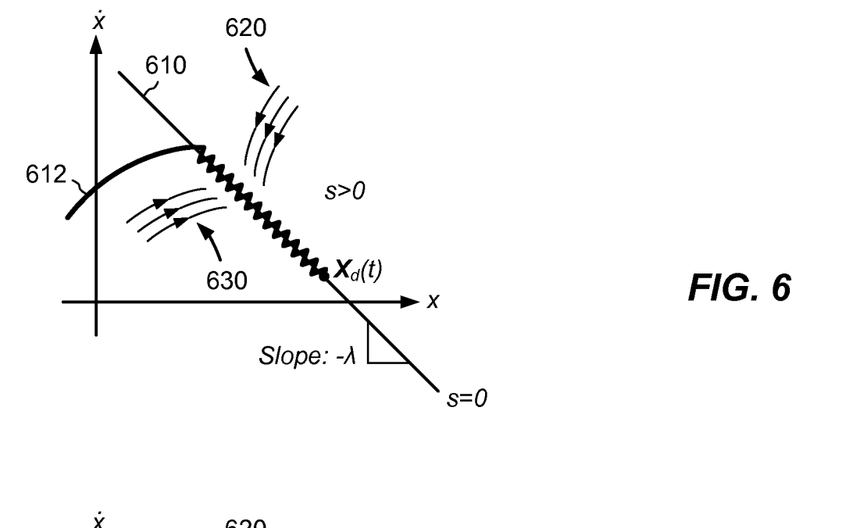
FIG. 6 is a phase plot of a sliding function of the example sliding controller of FIG. 2, which illustrates the problem of chattering when there is no boundary layer.

FIG. 6 shows a phase plot of a dynamic response of the sliding controller 240 in the absence of the boundary layer, such that the selector 580 always selects the signal 562. Here, x represents the position of the shaft 144 of the brushless DC motor 142, and ẋ represents the velocity of the shaft 144. The line 610 represents the sliding surface, i.e., a line of the sliding function where s=0. The curve 612 represents the actual response of the motor shaft 144 when controlled by the sliding controller 240. Here it is seen that the curve 612 quickly converges to the sliding surface 610, and proceeds to chatter as the response follows the sliding surface 610 to the desired value, $x_d(t)$. Chattering is caused by the operation of the SGN function of the sign element 540. As is known, the SGN function provides an output of one if its input is positive, an output of negative one if its input is negative, and an output of zero if its input is zero. The system trajectory 612 tends to overshoot the sliding surface 610, causing control to be tossed back-and-forth across the sliding surface 610, because the feedback gain of the sliding controller 240 alternates in sign (on account of the SGN function) as the value of "s" crosses between positive and negative values. Lines 620 represent the gain gradient for s>0, whereas lines 630 represent the gain gradient for s<0. In other words, the discontinuity in gain, between a first value for s>0 and a second value s<0, contributes to the chattering effect.

Figure 7:
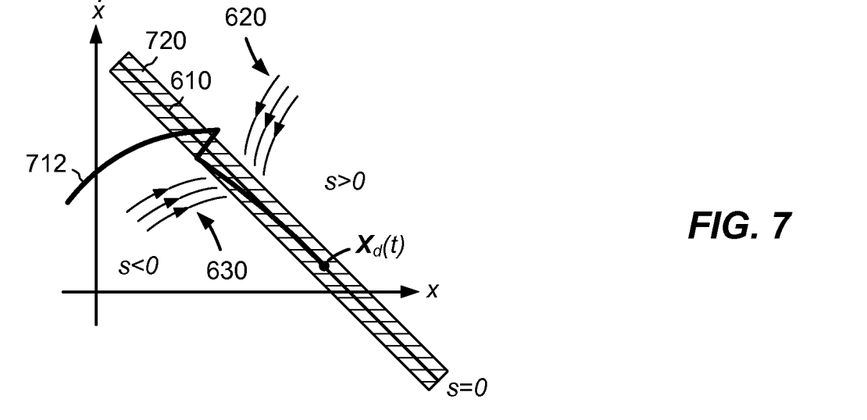
FIG. 7 is a phase plot of the sliding function of the example sliding controller of FIG. 2, which shows a reduction in chattering through the use of a boundary layer around the sliding surface through which gain of the sliding controller is transitioned to reduce discontinuities.

FIG. 7 shows a phase plot for the sliding controller 240 where the width Φ of the boundary layer is greater than zero. Here, a boundary layer 720 is shown around the sliding surface 610. Unlike the case in FIG. 6, the feedback gain in this example is continuous in the vicinity of the sliding surface 610, reducing or eliminating the effects of chatter.

Figure 8:
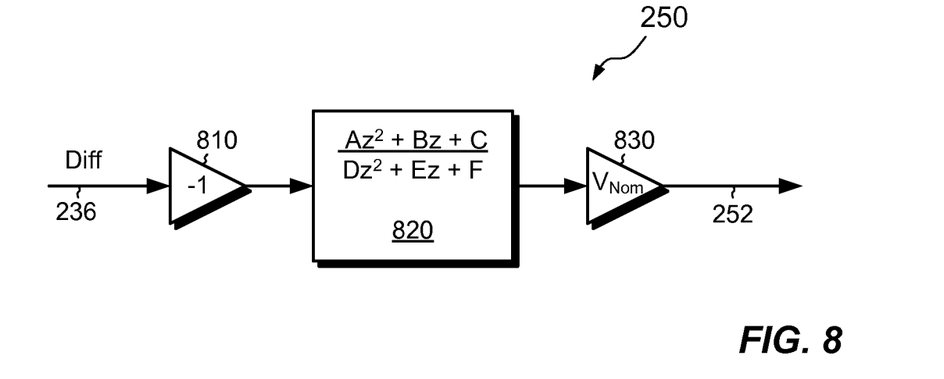
FIG. 8 is a block diagram of an example second controller of FIG. 2.

FIG. 8 shows an example implementation of the second controller 250. Here, the second controller 250 takes the form of a PID controller having a first gain element 810, a PID stage 820, and a second gain element 830. The second gain element 830 is seen to have a gain of $V_{Nom}$, which represents a nominal voltage of the battery 132. The second gain element 830 thus operates in cooperation with the source voltage normalization circuit 270 to compensate for changes in battery voltage. In particular, the gain element 830 together with the source voltage normalization circuit 270 provides unity gain when the signal 136 reports a battery voltage equal to $V_{Nom}$.

Although FIG. 8 shows the second controller 250 implemented as a PID controller, this is merely an example. Alternatively, the second controller 250 may be realized with a Kalman controller, an H2 controller, or an H-infinity controller and so on, for example.

Figure 9:
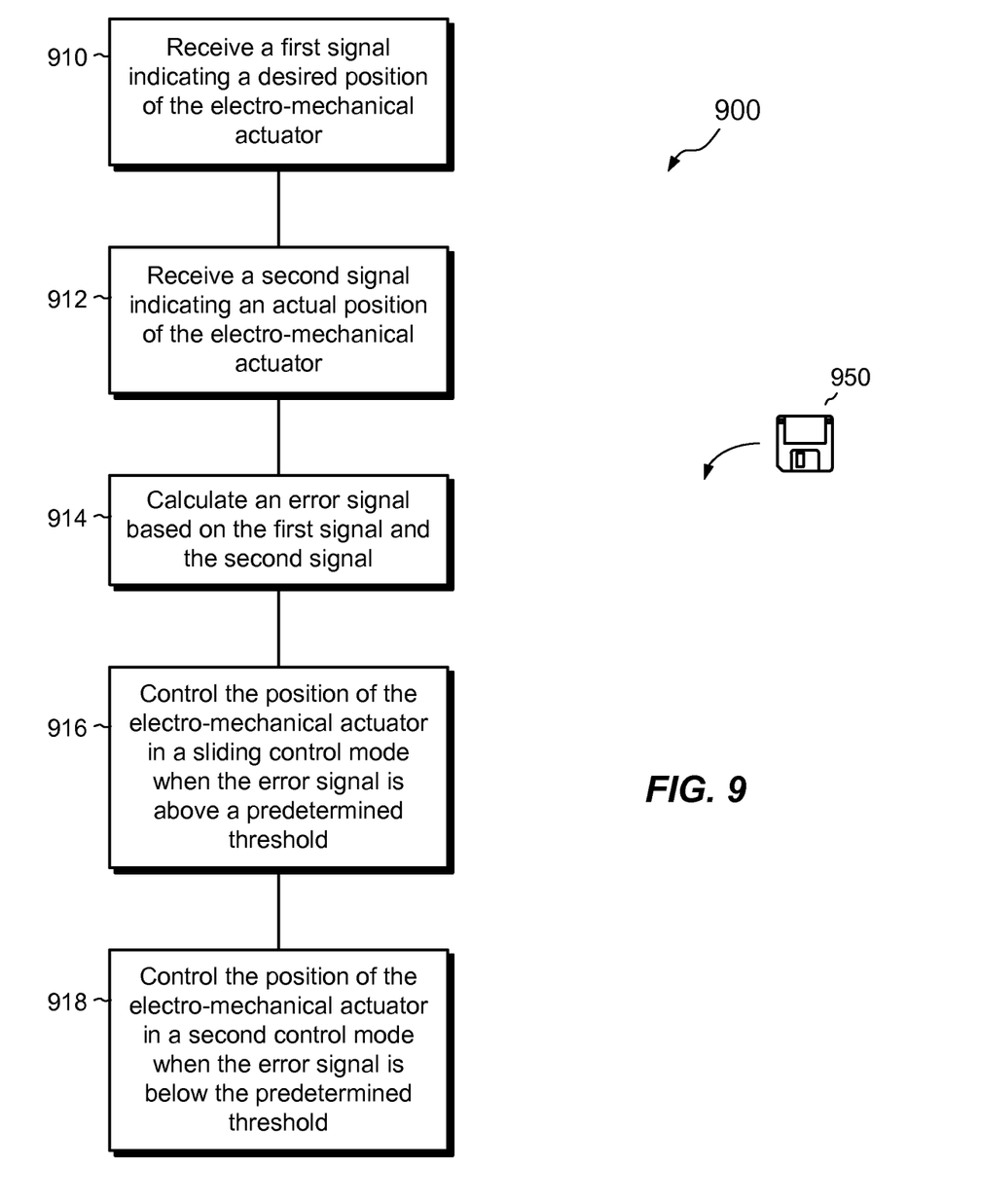
FIG. 9 is a flowchart showing an example process for controlling an electro-mechanical actuator using a sliding control mode and a second control mode according to improvements hereof.

FIG. 9 illustrates a process 900 that may be carried out in connection with the apparatus 100. This process is typically performed by the constructs described in connection with the control circuit 110 as shown in FIGS. 2-5 and 8. The various acts of the process 900 may be ordered in any suitable way. Accordingly, embodiments may be constructed in which acts are performed in orders different from those illustrated, which may include performing some acts simultaneously, even though the acts are shown as sequential in the illustrated embodiments.

At step 910, a first signal is received that indicates a desired position of an electro-mechanical actuator. For example, the control circuit 110 receives the signal 112 indicating the desired position of the motor shaft 144. The signal 112 may be provided in any suitable units, such as degrees, for example.

At step 912, a second signal is received that indicates an actual position of the electro-mechanical actuator. For example, the control circuit 110 receives the signal 148 indicating the rotational position of the motor shaft 144 as measured by the sensor 146. In an alternative arrangement, a position of the flap 150 can be measured directly if a suitable sensor is provided.

At step 914, an error signal is calculated based on the first signal and the second signal. For example, the error circuit 230 calculates the signal 238 ($E_{Norm}$) based on the signal 112 and the signal 148, in the manner described in connection with FIG. 2.

At step 916, the position of the electro-mechanical actuator is controlled in a sliding control mode when the error signal is above a predetermined threshold. For example, as shown in FIG. 2, the selector 260 selects the sliding mode control signal 242 for its output when the signal 238 ($E_{Norm}$) exceeds the threshold 114.

At step 918, the position of the electro-mechanical actuator is controlled in a second control mode when the error signal is below the predetermined threshold. For example, as shown in FIG. 2, the selector 260 selects the second control signal 252 for its output when the signal 238 ($E_{Norm}$) is less than the threshold 114.

An improved technique has been described for controlling an electro-mechanical actuator. The technique combines a sliding mode of control with a second mode of control. An error signal is generated based on the difference between an input position signal and a feedback position signal. When the error signal is above a predetermined threshold, the actuator is controlled in the sliding control mode. When the error signal is below the predetermined threshold, the actuator is controlled in the second control mode. The combination of the sliding control mode with the second control mode yields a robust controller that can tolerate large parameter variations and uncertainties without sacrificing precise steady state tracking.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described certain embodiments, numerous alternative embodiments or variations can be made. For example, although the improved technique has been described for use in airborne applications, it can also be applied in a myriad of other applications for controlling the position of electro-mechanical actuators.

Also, although improvements have been described in connection with brushless DC motors, they may be applied with other types of motors, such as stepper motors, for example.

Also, although a particular combination of sliding mode control and a second mode of control are described for controlling the position of an actuator, embodiments of the invention may alternatively be expressed as a combination of a first sliding mode control, which includes an integral term, and a second sliding mode of control, which includes boundary layer control. A transition is made between the first sliding mode control and the second sliding mode control in the vicinity of the sliding surface. Secondarily, an additional control mode may be applied, such as PID control or some other type of control that is not susceptible to chattering, and such additional control mode may be switched in for controlling the actuator in the vicinity of a steady state value, e.g., when the position of the actuator approaches its programmed position.

Further, although specific features are shown and described with reference to particular embodiments, such features may be included in any of the disclosed embodiments and their variants. Thus, it is understood that features disclosed in connection with any embodiment are included as variants of any other embodiment, whether such inclusion is explicit or not.

Further still, the improvement or portions thereof may be embodied as a non-transient computer-readable storage medium, such as a magnetic disk, magnetic tape, compact disk, DVD, optical disk, flash memory, and the like (shown by way of example as medium 950 in FIG. 9). Multiple computer-readable media may be used. The medium (or media) may be encoded with instructions which, when executed on one or more processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method of controlling an electro-mechanical actuator, comprising:
   receiving a first signal indicating a desired position of the electro-mechanical actuator;
   receiving a second signal indicating an actual position of the electro-mechanical actuator;
   calculating an error signal based on the first signal and the second signal;
   controlling the position of the electro-mechanical actuator in a sliding control mode when the error signal is above a predetermined threshold; and
   controlling the position of the electro-mechanical actuator in a second control mode when the error signal is below the predetermined threshold.

2. The method of claim 1, wherein the second control mode is selected from the group consisting of (i) a proportional-integral-derivative, PID, control mode, (ii) a Kalman control mode, (iii) an H2 control mode, and (iv) an H-infinity control mode.

3. The method of claim 2, wherein controlling the position of the electro-mechanical actuator in the sliding control mode includes:
   computing a value of a sliding function s such that s=0 defines a sliding surface of the sliding mode control;
   generating a sliding mode control signal via a first path when the computed value of s falls outside a boundary layer around the sliding surface; and
   generating the sliding mode control signal via a second path when the computed value of s falls within the boundary layer around the sliding surface.

4. The method of claim 3, wherein the first path has a first gain on one side of the sliding surface (s<0) and a second gain on another side of the sliding surface (s>0), wherein the second path provides a transition between the first gain and the second gain within the boundary layer.

5. The method of claim 4, wherein the transition between the first gain and the second gain provided by the second path within the boundary layer is substantially linear.

6. The method of claim 4, wherein controlling the position of the electro-mechanical actuator in the sliding control mode further includes receiving an error signal proportional to the difference between the first signal and the second signal and integrating the error signal.

7. The method of claim 4, wherein controlling the position of the electro-mechanical actuator in the sliding control mode further includes:
   driving a pulsewidth modulator with the sliding mode control signal to produce a pulsewidth modulated signal;
   driving a brushless DC motor with a power source switched to the brushless DC motor using the pulsewidth modulated signal; and
   driving the actuator with the brushless DC motor.

8. The method of claim 7, further comprising establishing control parameters of the sliding control mode based on modeled physical characteristics of the brushless DC motor.

9. The method of claim 8, further comprising:
   measuring a voltage of the power source; and
   dividing the sliding mode control signal by the measured voltage to compensate for variations in the voltage of the power source.

10. The method of claim 7, wherein controlling the position of the electro-mechanical actuator in the second control mode includes:
    generating a second control signal;
    driving the pulsewidth modulator with the second control signal to produce the pulsewidth modulated signal;
    driving the brushless DC motor with a power source switched to the brushless DC motor using the pulsewidth modulated signal; and
    driving the actuator with the brushless DC motor.

11. The method of claim 10, further comprising:
    measuring a voltage of the power source; and
    normalizing the second control signal based on the measured voltage of the power source to compensate for variations in the voltage of the power source.

12. The method of claim 7, wherein calculating the error signal includes:
    calculating a difference signal proportional to a difference between the first signal and the second signal;
    calculating a magnitude of the quotient of the difference signal divided by the first signal.

13. A control circuit for controlling an electro-mechanical actuator, comprising:
    a sliding mode controller configured to generate a sliding mode control signal;
    a second controller configured to generate a second mode control signal;
    an error circuit configured to generate an error signal based on a difference between an input signal indicative of a desired position of the electro-mechanical actuator and a feedback signal indicative of an actual position of the electro-mechanical actuator; and
    a selector circuit coupled to the sliding mode controller, the second controller, and the error circuit, and configured (i) to select the sliding mode control signal to control the electro-mechanical actuator when the error signal is above a predetermined threshold and (ii) to select the second mode control signal to control the electro-mechanical actuator when the error signal is below the predetermined threshold.

14. The control circuit of claim 13, wherein the second controller is selected from the group consisting of (i) a proportional-integral-derivative, PID, controller, (ii) a Kalman controller, (iii) an H2 controller, and (iv) an H-infinity controller.

15. The control circuit of claim 14, wherein, when configured to generate the sliding mode control signal, the sliding mode controller is further configured to:
    compute a sliding function s such that s=0 defines a sliding surface of the sliding mode control;
    generate the sliding mode control signal via a first path when s falls outside a boundary layer around the sliding surface; and
    generate the sliding mode control signal via a second path when s falls within the boundary layer around the sliding surface.

16. The control circuit of claim 15, wherein the first path has a first gain on one side of the sliding surface (s<0) and a second gain on another side of the sliding surface (s>0), wherein the second path provides a substantially linear transition between the first gain and the second gain within the boundary layer.

17. The control circuit of claim 16, wherein the error circuit, when configured to generate the error signal, is further configured to generate a difference signal proportional to a difference between an input signal indicative of a desired position of the electro-mechanical actuator and a feedback signal indicative of an actual position of the electro-mechanical actuator, and wherein the sliding mode controller includes an integrator configured to integrate the difference signal.

18. The control circuit of claim 17, wherein the selector has an output coupled to a motor for driving the electro-mechanical actuator, wherein the motor is driven from a power source, wherein a measurement circuit measures a voltage of the power source, and wherein the control circuit further comprises a dividing circuit, coupled to the output of the selector and to the measurement circuit, and configured to divide the selected control signal by the measured voltage of the power source.

19. A non-transitory computer-readable medium including instructions which, when executed by a control circuit, cause the control circuit to perform a method for controlling an electro-mechanical actuator, the method comprising:
    receiving a first signal indicating a desired position of the electro-mechanical actuator;
    receiving a second signal indicating an actual position of the electro-mechanical actuator;
    calculating an error signal based on the first signal and the second signal;
    controlling the position of the electro-mechanical actuator in a sliding control mode when the error signal is above a predetermined threshold; and
    controlling the position of the electro-mechanical actuator in a second control mode when the error signal is below the predetermined threshold.

20. The non-transient computer-readable medium of claim 19, wherein controlling the position of the electro-mechanical actuator in the sliding control mode includes:
    computing a sliding function s such that s=0 defines a sliding surface of the sliding mode control;
    generating a sliding mode control signal via a first path when s falls outside a boundary layer around the sliding surface; and
    generating the sliding mode control signal via a second path when s falls within the boundary layer around the sliding surface,
    wherein the first path has a first gain on one side of the sliding surface (s<0) and a second gain on another side of the sliding surface (s>0), wherein the second path provides a substantially linear transition between the first gain and the second gain within the boundary layer.

* * * * *